UNITED STATES PATENT OFFICE.

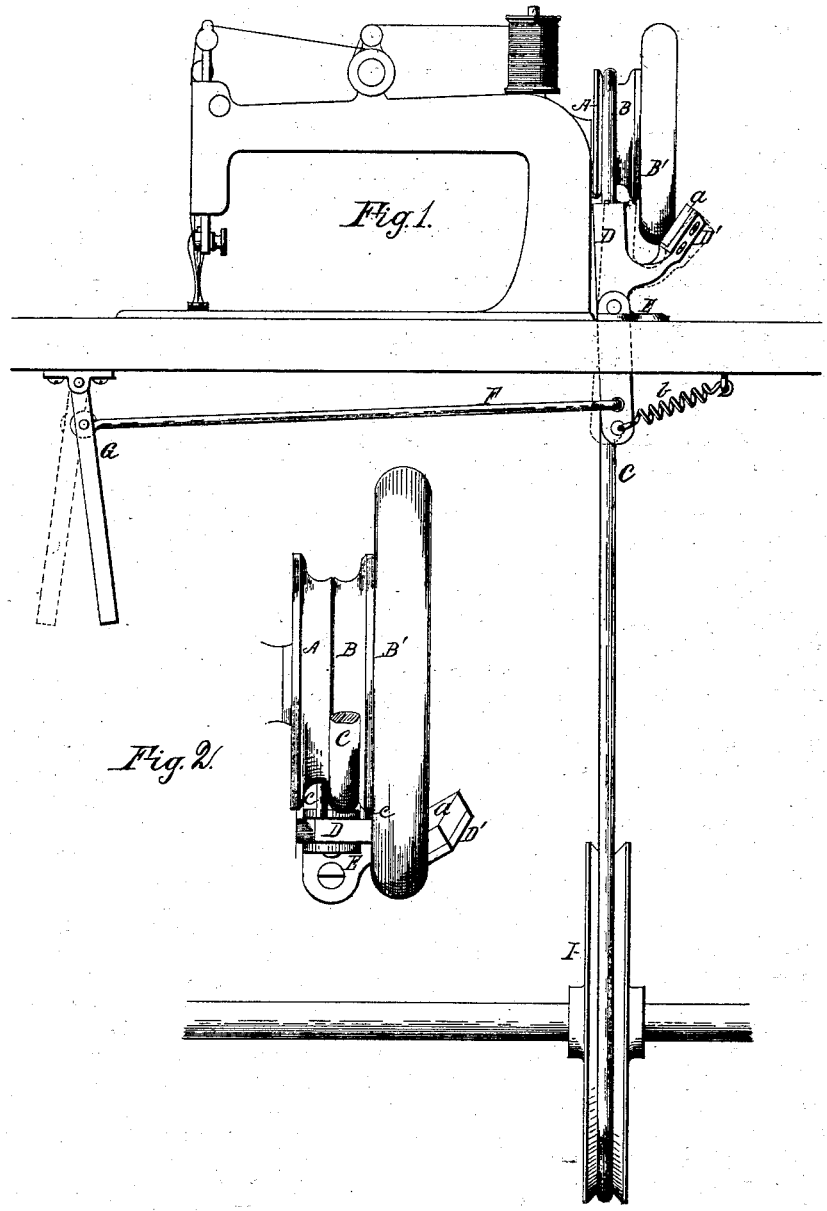

WILLIAM A. OTTO AND BENJAMIN A. METCALF, OF CEDAR RAPIDS, IOWA.

COMBINED BELT-SHIFTER AND BRAKE.

SPECIFICATION forming part of Letters Patent No. 317,411, dated May 5, 1885.

Application filed March 9, 1885. (No model.)

*To all whom it may concern:*

Be it known that we, WILLIAM A. OTTO and BENJAMIN A. METCALF, citizens of the United States, residing at Cedar Rapids, in the county of Linn and State of Iowa, have invented certain new and useful Improvements in Belt-Shifters and Brakes, of which the following is a specification.

Our invention relates to apparatus for starting and stopping rotary motion, particularly in light rapidly-running machinery; and our object is to produce an effective device for that purpose, less expensive, and simpler in construction and operation than those in general use.

The invention consists in a belt-shifter adapted to act as a brake to stop or retard motion, operating in connection with round or analogous belts running on fast and loose pulleys of peculiar shape, as will be hereinafter more fully set forth.

In the accompanying drawings, Figure 1 represents an elevation of the invention as applied to a sewing-machine, and Fig. 2 a plan view of the brake and pulleys.

Similar letters of reference indicate corresponding parts.

In the ordinary apparatus for this purpose motion is communicated from the line-shaft to a counter-shaft, or equivalent device, and thence by means of a system of levers, sleeves, and clutches, friction or otherwise, the motion is transmitted to the machine. Such brakes are necessarily quite complicated and expensive, are liable to get out of order, and occupy an unnecessary amount of room. To avoid these common objections we apply the principles of the fast and loose pulleys directly to the machine, shifting the belt running from the line-shaft, and checking or stopping the motion through the medium of the following simple elements:

A is a loose pulley, and B a fast pulley, on the operative shaft of the machine. They are provided with a slight groove in the periphery to receive the round belt C, but not so deep as to hinder the shifting of the belt from one to the other. The outer flange may be as high as the belt, to the better retain the belt in the proper position. The fast pulley is also provided with a larger portion, B', corresponding with an ordinary balance-wheel, which runs between two arms of the belt-shifter D, pivoted in the bearing-block E, and operated by the lever G, attached to it by connecting-rod F and the spring $b$, as shown in Fig. 1. The outer arm of the belt-shifter D' is provided with a wearing-block, $a$, of wood, leather, or other suitable material, and the inner branch may be so constructed, if desired; but as it is less exposed to wear than the other it may operate without. In practice we regard it as desirable to give the outer arm an angle, as represented, so that the pressure is about on a line drawn from the point of contact to the shaft at the opposite side of the loose pulley.

It is evident that the brake may be made to operate altogether on the face, or nearly, if not quite, on the periphery, by varying the shape of this branch of the shifter.

The operation of the invention will be readily seen. The belt C, passing between the pins $c\ c$ in the upper end of the shifter-arm, is, when left free, thrown onto the loose pulley A by the tension of the spring $b$, and at the same time the brake D' is pressed against the rim of the wheel B', quickly stopping it if in motion.

The operator starts the machine by throwing the lever G over, and with it the belt-shifter, to the position indicated by the dotted lines in Fig. 1. To check or retard the motion it is only necessary to continue this movement a little farther, when the inner brake, D, is brought in contact with the wheel B', causing the belt to slip and diminishing the speed as much as may be desired. In the case of sewing-machines and other light machines at which the operator sits, the lever may be moved by the knee. We prefer this to a pedal or foot-lever, as it is simpler, and does not obstruct the floor.

Thus constructed, the invention is inexpensive in manufacture, easy of application, neat in appearance, and in practice has been found to be perfectly effective in operation. Besides these advantages, it is less liable to soil the work than many other brakes, as little or no application of oil is required.

Having thus briefly described our invention, what we claim as new, and desire to secure by Letters Patent, is—

1. In a combined belt-shifter and brake, the shifter-arm D, having pins $c\ c$, to straddle the belt, and a brake-arm, D', adapted to bear against the wheel B' simultaneously as the belt is shifted to the loose pulley A, substantially as shown and described.

2. In a combined belt-shifter and brake, the shifter arm D, having pins c c, to straddle the belt C, and with its head so adjusted with respect to the fast pulley B that it may be pressed against the wheel B' with the same movement required in shifting the belt, for the purpose of retarding the motion, substantially as set forth.

3. In a combined belt-shifter and brake, the shifter-arm D, having brake-arm D', in combination with fast pulley B, having rim or flange B', loose pulley A, and belt C, all substantially as and for the purpose set forth.

4. In a combined belt-shifter and brake, the combination of shifter D, having brake-head D', the brake-wheel B', round or analogous belt C, and fast and loose pulleys B A, having a groove in their peripheries sufficient to retain the belt, but shallow enough on the inner sides to allow the belt to be freely shifted from one to the other, substantially as set forth.

5. In a combined belt-shifter and brake, the combination of loose pulley A, fast pulley B, having brake wheel B', belt C, shifter D c c, brake-head D' a, pivot-block E, connecting-rod F, and lever G, all constructed, arranged, and operating substantially as set forth.

6. In a combined belt shifter and brake, the combination of loose pulley A, fast pulley B, having brake-wheel B', belt C, shifter-arm D, brake-arm D', pivot-block E, and spring b, adapted to automatically throw the belt onto the loose pulley and stop the motion of the machine, substantially as set forth.

In testimony whereof we affix our signatures in presence of two witnesses.

WILLIAM A. OTTO.
BENJAMIN A. METCALF.

Witnesses:
FRANK G. CLARK,
L. T. WILCOX.